United States Patent
Dominick

(10) Patent No.: US 10,140,106 B2
(45) Date of Patent: Nov. 27, 2018

(54) METHOD, COMPUTER READABLE MEDIUM AND SYSTEM FOR DEPLOYING AND MERGING RELEASE INDEPENDENT APPLICATIONS

(75) Inventor: Lutz Dominick, Eggolsheim (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 1144 days.

(21) Appl. No.: 13/349,983

(22) Filed: Jan. 13, 2012

(65) Prior Publication Data

US 2013/0185706 A1 Jul. 18, 2013

(51) Int. Cl.
*G06F 9/445* (2018.01)
*G06F 8/72* (2018.01)
*G06F 3/00* (2006.01)
*G06F 8/60* (2018.01)

(52) U.S. Cl.
CPC ...................... *G06F 8/60* (2013.01)

(58) Field of Classification Search
CPC .................................................. G06F 9/445
USPC ....................................... 717/171, 174, 178
See application file for complete search history.

(56) References Cited

U.S. PATENT DOCUMENTS

| | | | | |
|---|---|---|---|---|
| 6,389,588 B1 * | 5/2002 | Wadhwa | ................... | G06F 8/74 717/106 |
| 7,735,079 B1 * | 6/2010 | Davis | ........................ | G06F 8/61 717/174 |
| 7,945,906 B2 * | 5/2011 | Bourke-Dunphy | ....... | G06F 8/61 717/168 |
| 8,381,171 B2 * | 2/2013 | Shields | ......................... | 717/102 |
| 8,505,069 B1 * | 8/2013 | Solodovnikov | .......... | G06F 8/65 709/224 |
| 2007/0169114 A1 * | 7/2007 | Birk Olsen | ............... | G06F 8/61 717/174 |
| 2007/0240154 A1 * | 10/2007 | Gerzymisch et al. | ........ | 717/174 |
| 2007/0277115 A1 * | 11/2007 | Glinsky | .................... | G01V 1/34 715/771 |
| 2009/0044170 A1 * | 2/2009 | Bernardi | .................... | G06F 8/61 717/105 |
| 2010/0153696 A1 * | 6/2010 | Beachem et al. | .................. | 713/2 |
| 2011/0238444 A1 * | 9/2011 | Klingler | ............................ | 705/3 |
| 2011/0296395 A1 * | 12/2011 | Vidal | ......................... | G06F 8/68 717/171 |
| 2011/0296401 A1 * | 12/2011 | DePoy | .......................... | 717/174 |

(Continued)

FOREIGN PATENT DOCUMENTS

CN 101650659 A 2/2010

*Primary Examiner* — Li B Zhen
*Assistant Examiner* — Mohammad Kabir
(74) *Attorney, Agent, or Firm* — Harness, Dickey & Pierce, P.L.C.

(57) ABSTRACT

A method, computer readable medium and system are disclosed. An embodiment of the method includes intercepting an application installation procedure, classifying the application, determining information associated with the application and installing the application based on the classification and the determined information. Installing the application may further include determining compatibility information of one or more target nodes and adding the application to at least one of the target nodes if the application compatibility information and the compatibility of the at least one target node is confirmed.

16 Claims, 5 Drawing Sheets

(56) References Cited

U.S. PATENT DOCUMENTS

2013/0152047 A1* 6/2013 Moorthi ............... G06F 11/368
717/124
2014/0040873 A1* 2/2014 Goldman ................ G06F 8/65
717/168

* cited by examiner

METHOD, COMPUTER READABLE MEDIUM AND SYSTEM FOR DEPLOYING AND MERGING RELEASE INDEPENDENT APPLICATIONS

BACKGROUND

Field

Embodiments generally relate to deployment and merge of independent application and/or software releases for a product line.

Related Art

Large systems (e.g., medical systems like medical imaging devices and hospital management systems) include multiple products from different origins (e.g., business units with specific applications). These products are developed independently but use common product-line code, for example, for common look and feel, run-time infrastructures, data repositories, and domain specific protocols and tech-stacks.

On the one hand, the products are intended to be independent of each other, have internal product variability, extensibility, deployments on multiple physical or virtual machines, and dedicated shipment time points from their development sites, where the products have been developed independent from other development sites. On the other hand, applications from these independent products have considerable technical dependencies among each other, due to large amount of common product-line code that sits in such an application, and because applications from two independent products often need tighter technical coupling for specialized medical diagnostics (e.g., MR+MI, CT+MI), or at least need a joint deployment on the same hardware box and software run-time system, due to, for example, cost constraints.

Without additional technical solutions and under the above constraints, a system installation and deployment may fail or render an unusable system, no matter if the medical system is installed from scratch with contributions from multiple independent products or if there is one independent application release added to an existing installation, due to the many touch points of that additional product with the existing system.

The reasons for potential failures are technical conflicts. The main conflict is that imperative (must have) overrides (files, data, content) on the existing system by an independent product releases may not be allowed, but can't be avoided with current technology, yet replacements may be business critical. Even worse, the installers (e.g., Window Installer) do not support smart merges and may give up control over the installation of a product if this installation received imperative overrides.

Examples of known deployment solutions are described below.

In one known solution, all independent products with their variability options are finally decided and synchronized before shipment, and all variability is 'frozen' initially, and 'unfrozen' after installation is complete. So all constraints are resolved at development time in a 'combined' release of independent products centrally on one dedicated 'integration' site for all contributing sites. Shipping goes to one or more physical machine or box with actually identical 'frozen' setup. But this combined delivery solution does not allow product release independence, for example, neither independent release time-points nor independent shipment of release content from, for example, only one site.

In another known solution, merges based on pure 'eternal' backward or forward compatibility have failed. For example, Microsoft had promised the backward compatibility of the Win32 API for many years, but finally gave up. Microsoft had also promised .NET framework compatibility but failed. Windows Updater avoids any merge, but imperatively replaces local files after a difference query with the installed releases and downloads from the deployment store. Native software distribution mechanisms (e.g., based on a Managed Node Package, Microsoft Active Directory, etc.) ship software packages but assume that all further decisions are taken by some other software on the target node.

In another known solution, the same product can be installed in many versions, the user or the application picks the right version by manual selection or by always using the own installation path, never relate neither products nor multiple versions of the same product to each other, but keep them independent, use isolated install subdirectory trees for each product and product version and always separated installation packages. This is the default solution used by all vendors, like Microsoft. Visual Studio application and .NET frameworks, Java Run-Time, Perl programming language, Adobe Reader application, and many more. Some software force the user to first install the correct version of their underlying run-time system, for example, the required version of the Java run-time, regardless of potential side-effects on other Java based software on the same machine. Some software even refuse to exist more than once on a machine and force the user to remove previous versions of the same product, like Microsoft Windows or releases of SAP's enterprise software.

Each of the above known solutions does not allow for release independence of applications or software.

SUMMARY

The inventors have recognized, in the context of deploying applications and/or software releases, release independence may be accomplished through a new system and method. In at least one embodiment, the system and method use a new Hybrid Auto Deployment (HyAD) module.

One embodiment of the present application includes a method. The method includes intercepting an application installation procedure, classifying the application, determining information associated with the application and installing the application based on the classification and the determined information. Installing the application may further include determining compatibility information of one or more target nodes and adding the application to at least one of the target nodes if the application compatibility information and the compatibility of the at least one target node is confirmed.

One other embodiment of the present application includes a method. The method includes receiving information associated with an application to be deployed, the information including application compatibility information, determining compatibility information of one or more target nodes, transferring an existing application associated with the application to at least one compatible target node if the application compatibility information and the compatibility of the at least one target node is not confirmed, and adding the application to at least one of the compatible target nodes.

One embodiment of the present application includes an apparatus. The apparatus includes a memory, a processor, a first module (such as a HyAD module for example) and second module (such as an installer for example). The first module includes code segments that, when executed by the processor, cause the processor to intercept an application installation procedure, classify the application, and determine information associated with the application. The second module includes code segments that, when executed by the processor, cause the processor to install the application based on the classification and the determined information. The HyAD module may also determine compatibility information of one or more target nodes and adding the application to at least one of the target nodes if the application compatibility information and the compatibility of the at least one target node is confirmed. The first module may use this confirmation as final condition to trigger the installer, which then may result in a correct and successful and usable installation.

One other embodiment of the present application includes an apparatus. The apparatus includes a memory, a processor and a module, such as an installer for example. The module includes code segments that, when executed by the processor, cause the processor to receive information associated with an application to be deployed, the information including application compatibility information, determine compatibility information of one or more target nodes, and add the application to at least one of the target nodes if the application compatibility information and the compatibility of the at least one target node is confirmed.

Still another embodiment of the present application includes an apparatus. The apparatus includes a memory, a processor and a module such as an installer for example. The module includes code segments that, when executed by the processor, cause the processor to receive information associated with an application to be deployed, the information including application compatibility information, determine compatibility information of one or more target nodes, transfer an existing application associated with the application to at least one compatible target node if the application compatibility information and the compatibility of the at least one target node is not confirmed, and add the application to at least one of the compatible target nodes and create additional compatible deployment environments (virtual boxes) for installation on those target nodes where the compatibility is not confirmed.

One further embodiment of the present application includes a computer readable medium. The computer readable medium includes code segments that, when executed by a processor cause the processor to intercept an application installation procedure, classify the application, determine information associated with the application and install the application based on the classification and the determined information. Installing the application may further include determining compatibility information of one or more target nodes and adding the application to at least one of the target nodes if the application compatibility information and the compatibility of the at least one target node is confirmed.

BRIEF DESCRIPTION OF THE DRAWINGS

The present invention will become more fully understood from the detailed description of example embodiments given herein below and the accompanying drawings, wherein like elements are represented by like reference numerals, which are given by way of illustration only and thus are not limiting of the present invention and wherein.

Figure 1:
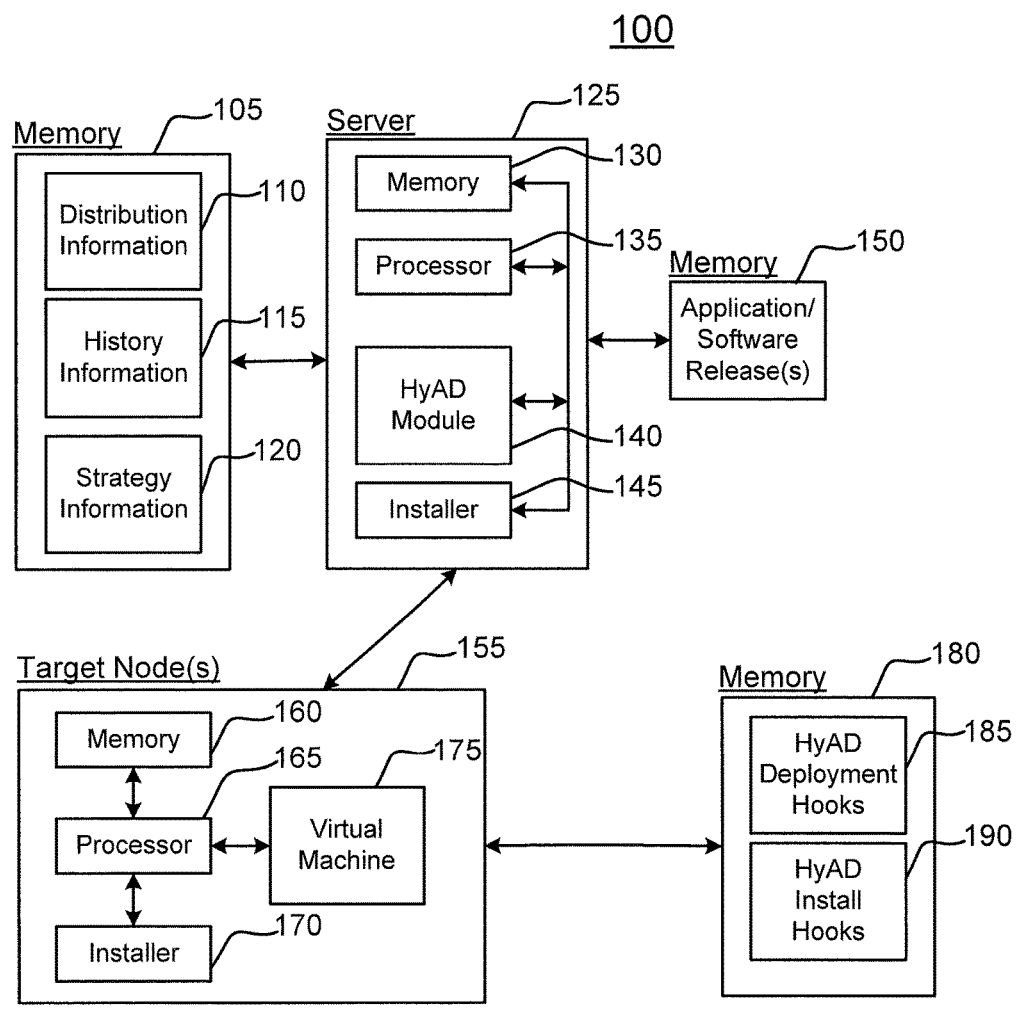
FIG. 1 illustrates a system according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

One embodiment of the present application includes an apparatus. The apparatus includes a memory, a processor, a first module, such as a HyAD module for example and a second module, such as an installer for example. The first module includes code segments that, when executed by the processor, cause the processor to intercept an application installation procedure, classify the application, and determine information associated with the application. The second includes code segments that, when executed by the processor, cause the processor to install the application based on the classification and the determined information. The first module may also determine compatibility information of one or more target nodes and adding the application to at least one of the target nodes if the application compatibility information and the compatibility of the at least one target node is confirmed. The HyAD module may also determine compatibility information of one or more target nodes in order to create new compatible deployment environments prior to adding the application to at least one of the new target nodes.

One other embodiment of the present application includes an apparatus. The apparatus includes a memory, a processor and a module, such as an installer for example. The module includes code segments that, when executed by the processor, cause the processor to receive information associated with an application to be deployed, the information including application compatibility information, determine compatibility information of one or more target nodes, and add the application to at least one of the target nodes if the application compatibility information and the compatibility of the at least one target node is confirmed.

Yet another embodiment of the present application includes an apparatus. The apparatus includes a memory, a processor and a module, such as an installer for example. The module includes code segments that, when executed by the processor, cause the processor to receive information associated with an application to be deployed, the information including application compatibility information, determine compatibility information of one or more target nodes, transfer an existing application associated with the application to at least one compatible target node if the application compatibility information and the compatibility of the at least one target node is not confirmed, and add the application to at least one of the compatible target nodes. The HyAD module may also determine compatibility information of one or more target nodes in order to create new compatible deployment environments prior to adding the application to at least one of the new target nodes.

FIG. 1 illustrates a system 100 according to an example embodiment. As shown in FIG. 1, the system 100 includes a memory 105, a server 125, a memory 150, one or more target nodes 155 and a memory 180. The memory 150 may be a portable memory. The memory 150 may include one or more portable memory devices (e.g., CD, DVD, SSD). The memory 150 may a fixed memory communicatively coupled to the server 125 via, for example an internet or intranet. Memory 150 may store an application or software release (e.g., new software version or hot fix).

The server 125 may include a memory 130, a processor 135, a Hybrid Auto Deployment (HyAD) module 140 and another module, such as an installer 145. The server 125 may be a multifunctional computing device. The server 125 may be associated with a cloud computing or multi-computer/networked environment (e.g., a hospital management system). The server 125 may be a standalone computing device. When the server 125 is a standalone computing device, the server 125 may be associated with controlling a computer controlled system (e.g., a medical imaging device or manufacturing equipment). When the server 125 is a standalone computing device, the server 125 may be configured to communicate with a network (an internet or an intranet).

The HyAD module 140 intercepts an installation procedure of an incoming installation package with Software Release(s) and classifies the installation package. The HyAD module 140 makes decisions for installation and deployment of the installation package. The installation package may be, for example the application or software release stored on the memory 150. Operation of the HyAD module 140 will be described in more detail below with regard to FIGS. 2-4.

The memory 130 and the processor 135 are known to those skilled in the art. The installer 145 may coordinate with the HyAD module 140 to install the installation package on, for example one or more of target nodes 155. The installer 145 may also coordinate with installer 170 to install the installation package. Installation of the installation package will be described in more detail below with regard to FIGS. 2-4.

The memory 105 may include one or more memory modules. The memory modules may be separate physical memories (e.g., hard drives), separate partitions on a single physical memory and/or separate storage locations on a single partition of a single physical memory. The memory modules may store information associated with the installation of software (e.g., software applications). The memory modules may store distribution information 110, history information 115 and strategy information 120. The distribution information 110 and the history information 115 may be received from the HyAD module 140. The strategy information 120 may be information associated with distribution of one or more installation packages and entered by an administrator.

The one or more target nodes 155 may include a memory 160, a processor 165, an installer 170 and a virtual machine 175. In one example embodiment, the one or more target nodes 155 may be associated with one or more physical machines. In another example embodiment, the one or more target nodes 155 may be associated with one or more virtual machines running on one or more physical machines. In still another example embodiment, the one or more target nodes 155 may be associated with one or more virtual machines running on one or more physical machines. In still another example embodiment, the one or more target nodes 155 may be associated with one or more virtual machines running on the server 125. As on skilled in the art will appreciate, other examples of target nodes may exist and the above examples may be combined as may be desired as a design choice.

The memory 180 may include one or more memory modules. The memory modules may be separate physical memories (e.g., hard drives), separate partitions on a single physical memory and/or separate storage locations on a single partition of a single physical memory. The memory modules may store information associated with the installation of software (e.g., software applications). The memory modules may store HyAD deployment hooks 185 and HyAD install hooks 190. The HyAD deployment hooks 185 and the HyAD install hooks 190 may be hooks configured to intercept calls to applications in order to determine where an application should be installed or executed (e.g., which of the one or more target nodes 155). A hook may be used when intercepting calls to an application to determine where to run the application from.

In typical systems, code and configuration files of independent products that may be integrated into a target system may have to stay aligned on multiple levels to give a complete system. The required alignment may not allow independence, which is desirable for productivity, time-to-market and innovations.

In typical systems, a common (e.g., from the release main line) of the product-line code may evolve between patches, hotfixes, service packs or releases of one independent product. Either the product itself may need the change or the common imposed the change. However, applications of two products may require two different common releases at the same time. Typically, at run-time, only one common is allowed per system. Therefore, a software merge is technically not feasible.

Scalable deployments with many contributing products and applications require deployment variability in the field, using multiple virtual and physical machines. At the same time, multiple independent releases are typically planned and maintained and installed manually, once or multiple times, site specific and product specific. However, typically an installation requires a guaranteed deployment target, but depending on site specifics and because of smaller independent deliveries of independent products, multiple target boxes may exist and multiple manual install/update runs may be costly. As a result, in-house development on multiple sites has typically needed to know the deployment target structure variability in the field for installation and updates. However, this information base may be incomplete and fragile. With multiple independent releases on a combination of virtual and physical machines the complexity and uncertainty increases.

According to example embodiments, products are deployed to the installed base (existing or new installations and deployments) under the control of the HyAD module 140. The HyAD module 140 may be configured to decide and manage the final deployment type, the install and the update paths that a combined or independent product release may take, based on information gathered by the HyAD module 140 for this deployment on this site, and based on updateable solution strategies. The HyAD module 140 decision may be a prerequisite to the actual install/update/upgrade process of a single release, which depends on the installer 145.

Figure 2:
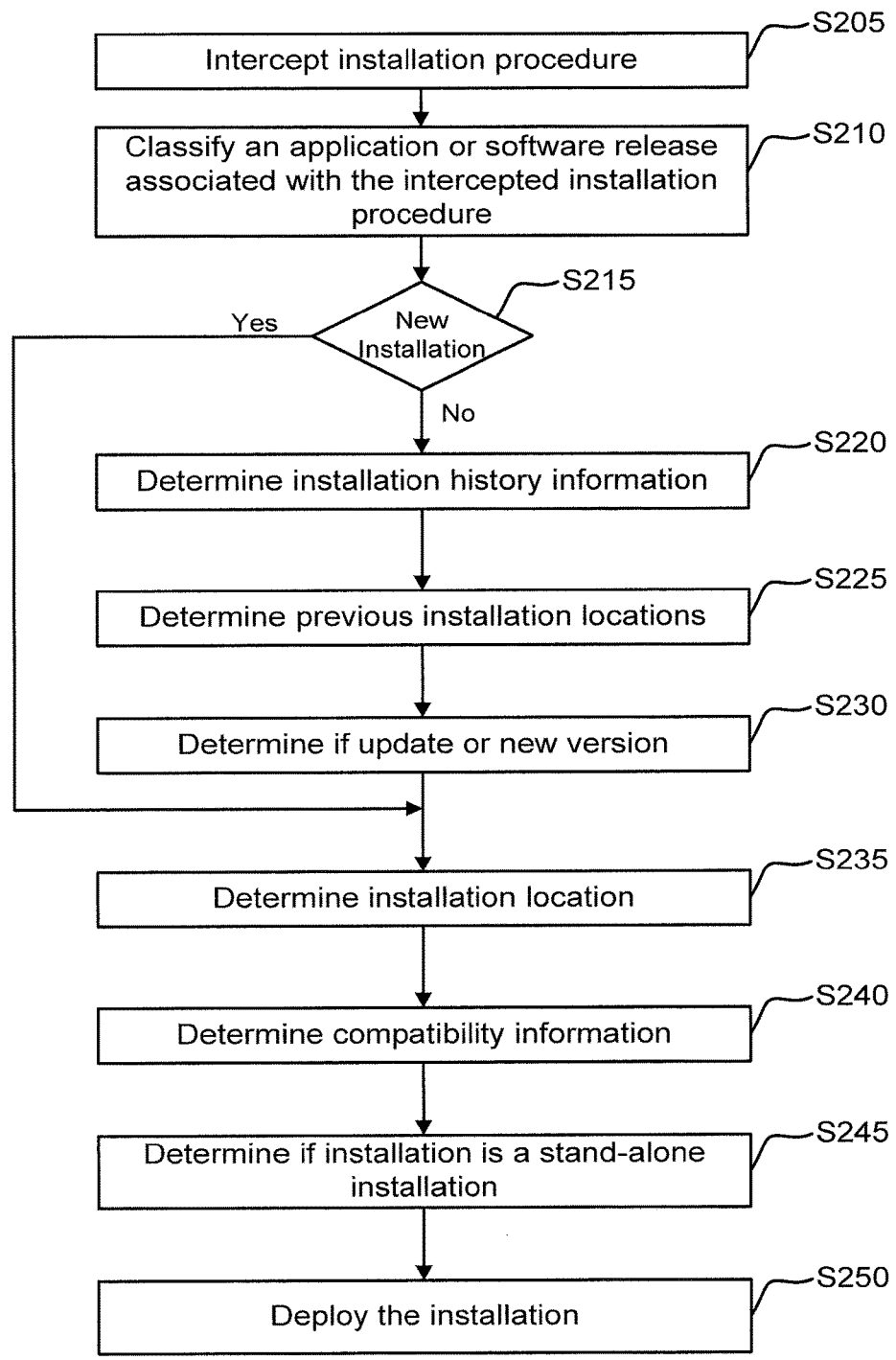
FIG. 2 illustrates a pre-install method according to at least one example embodiment.

One embodiment of the present application includes a method. The method includes intercepting an application installation procedure, classifying the application, determining information associated with the application and installing the application based on the classification and the determined information. Installing the application may further include determining compatibility information of one or more target nodes and adding the application to at least one of the target nodes if the application compatibility information and the compatibility of the at least one target node is confirmed FIG. 2 illustrates a pre-install method according to an example embodiment. Referring to FIG. 2, in step S205 a processor intercepts an application installation procedure. Intercepting an application installation procedure may include, for example, stopping or pausing a software release installer, copying release code and installation parameters and storing state information about the installation (e.g., is the installation part of a larger system installation). The HyAD module may also determine compatibility information of one or more target nodes in order to create new compatible deployment environments prior to adding the application to at least one of the new target nodes, and configuring HyAD hook actions to configure necessary data connections and connections to local and central repositories.

The processor may be a processor associated with HyAD module 140 (e.g., processor 135). Although each of the steps below may be described as being performed by processor 135, one skilled in the art will appreciate that the HyAD module 140 includes the functionality and/or code that is used by the processor 135 to perform the steps. For example, an installation process may be initiated using an application or software release (e.g., new software version or hot fix) stored on memory 150. When an installation process is initialized using the application or software release stored on memory 150, processor 135 may intercept the installation procedure.

In step S210 the processor 135 classifies the application or software release associated with the intercepted installation procedure. For example, the processor 135 may classify the application or software release based on release descriptors (e.g., product name, release/hot fix, product line basic compatibility level descriptors and product line advanced compatibility level descriptors and deployment type descriptors). Information from the release descriptor may be evaluated by HyAD module 140 based on the configurable strategies in the strategy repository.

The basic compatibility level may be the compatibility contract of the 'common' and each release declares exactly one minimum basic compatibility level, which allows HyAD module 140 to calculate the basic compatibility match for each target node (or create a new 'common' run-time environment in a virtual box). The software release may contain one or more advanced compatibility levels in addition, which allows HyAD module 140 to calculate e.g. an exact match with all existing workflows that can be enhanced with a new application, or if the new application requires the creation of a dedicated isolation directory prior to the installation.

The deployment type may include the general deployment topology or layout, e.g. FAT/Stand-alone, or distributed like Rich Thin, Thin/Web, and the HyAD module 140 ensures that deployments of software release and the one or many target nodes match exactly and further HyAD hook actions act accordingly, e.g. using the correct central repositories remotely in distributed deployments. According to example embodiments, using the product name as a top-level match for any install/update activity may allow an installing entity to send a release package (including the application or software release) from a remote location (e.g., a service headquarters) one time.

In step S215, the processor 135 determines information associated with the application, for example determines if the installation is a new installation. If the installation is a new installation, processing moves to step S235. Otherwise, processing continues to step S220. For example, in step S215 the processor 135 may determine a product name associated with an application release or software release. The processor 135 may use the product name as a search key and search one or both of the distribution information 110 and the history information 115. If the product name is found in one or both of the distribution information 110 and the history information 115, the processor 135 may determine the application or software release is not a new installation. If the product name is not found in one or both of the distribution information 110 and the history information 115, the processor 135 may determine the application or software release is a new installation.

In step S220, the processor 135 determines installation history information. For example, the processor 135 may use the product name as a search key and search the history information 115 for all installation entries associated with the product name. For example, the search may return installation information associated with previous installations (e.g., software releases and hot fixes).

In step S225, the processor 135 determines previous installation locations. For example, the processor 135 may use the product name as a search key and search the distribution information 110 for all installation entries associated with the product name. For example, the search may return installation information associated with previous installations (e.g., software releases and hot fixes).

In step S230, the processor 135 determines if the installation is an update or a new version. Determining if the installation is an update or a new version may be based on the classification performed in step S210. For example, classification as a release or hot fix may be based on a version number (e.g., 2.0, 3.2.1, and the like). Version numbering schemes are known to those skilled in the art. Typically, if the number after the last period is not a zero (0), the application or software release is classified as a hot fix. Otherwise, the application or software release is classified as a release.

In step S235, the processor 135 determines an installation location. Typically, the installation location is determined by a software installer tied to the application or software release stored on, for example, the memory 150. According to example embodiments, the processor 135, using the HyAD module 140, the distribution information 110, the history information 115 and the strategy information 120, determines an installation location that may be different than where software installer tied to the application or software release would have installed the application or software release.

For example, the processor 135 may determine an installation location (e.g., one or more of the target nodes 155) based on the release descriptors (described above) and the distribution information 110, the history information 115 and the strategy information 120 and information in an on-site software distribution source (e.g., Microsoft Active Directory/ADSI). Further, if an identical version number is found in one of the distribution information 110 and/or the history information 115 a valid target node may be the previous install location.

For example, the processor 135 may decide, based on product-line basic compatibility level descriptor if a cooperating set of applications can be installed on one or more target nodes 155. If so, the processor 135 may trigger one or more install or updates (in step S250 below), where the product-line basic compatibility level descriptor denotes tested compatibility to a general run-time infrastructure, UI controls+forms+style guide, basic domain protocols and common data types, application life-cycle mechanisms and protocols, data exchange, message exchange, command exchange mechanisms, services/remote services/repository lifecycle mechanisms, etc, each of which may be backward compatible for improved release independence support. For example, one new or updated set of applications for PET/CT (see FIG. 5 described below) workitems may be applied to all fitting physical and virtual machines in a software distribution list.

Further, for example, the processor 135 may decide, based on product-line advanced compatibility level descriptor if one or more stand-alone applications may be installed in order to extend existing sets of cooperating applications. These new independent applications may be added to these sets of cooperating applications once or multiple times on one or more target nodes 155, and thereby trigger one or more install or updates (in step S250 below). The product-line advanced compatibility level descriptor may denote tested compatibility to dedicated application workflows in terms of workitem name, data ports, image manipulation tools, reporting capabilities etc, according to the required advanced capabilities. For example, one or more new or updated ad-hoc applications that the user can randomly pick for PET/CT (see FIG. 5 described below) workitems may be applied to all fitting physical and virtual machines in the software distribution list.

In step S240, the processor 135 determines compatibility information. For example, the processor 135 may determine the minimum hardware requirements (e.g., processor, memory, product-line hardware) required to operate the application or software. For example, the processor 135 may determine the software requirements (e.g., operating system, interdependent software/applications and product-line software) required to operate the application or software.

In step S245, the processor 135 determines if the installation is a stand-alone installation. For example, the processor 135 may determine is the installation is on a stand-alone computer or a computer controlled system (e.g., a medical imaging device or manufacturing equipment).

In step S250, the processor 135 deploys the installation and thus installs the application based upon the classification information. For example, and as indicated above, independent applications may be added to these sets of cooperating applications once or multiple times on one or more target nodes 155, and thereby causing processor 135 to trigger one or more install or updates. The applications may be installed by a processor associated with a processor associated with the one or more target nodes 155 (e.g., processor 165). Installing the application may include merging applications from multiple development sites at installation time.

If the processor associated with the one or more target nodes 155 performs the installation, step S250 includes transferring control of the deployment together with information gathered in the previous steps (e.g., compatibility information determined in step S240). Further, discussion of deploying the installation is described in more detail below with regard to FIG. 3.

One other embodiment of the present application includes a method. The method includes receiving information associated with an application to be deployed, the information including application compatibility information, determining compatibility information of one or more target nodes, transferring an existing application associated with the application to at least one compatible target node if the application compatibility information and the compatibility of the at least one target node is not confirmed, and adding the application to at least one of the compatible target nodes, or creating a compatible target node (e.g., virtual box) prior to adding the application, based on the currently configured strategies.

Still another embodiment of the present application includes a method. The method includes receiving information associated with an application to be deployed, the information including application compatibility information, determining compatibility information of one or more target nodes, and adding the application to at least one of the target nodes if the application compatibility information and the compatibility of the at least one target node is confirmed.

Figure 3:
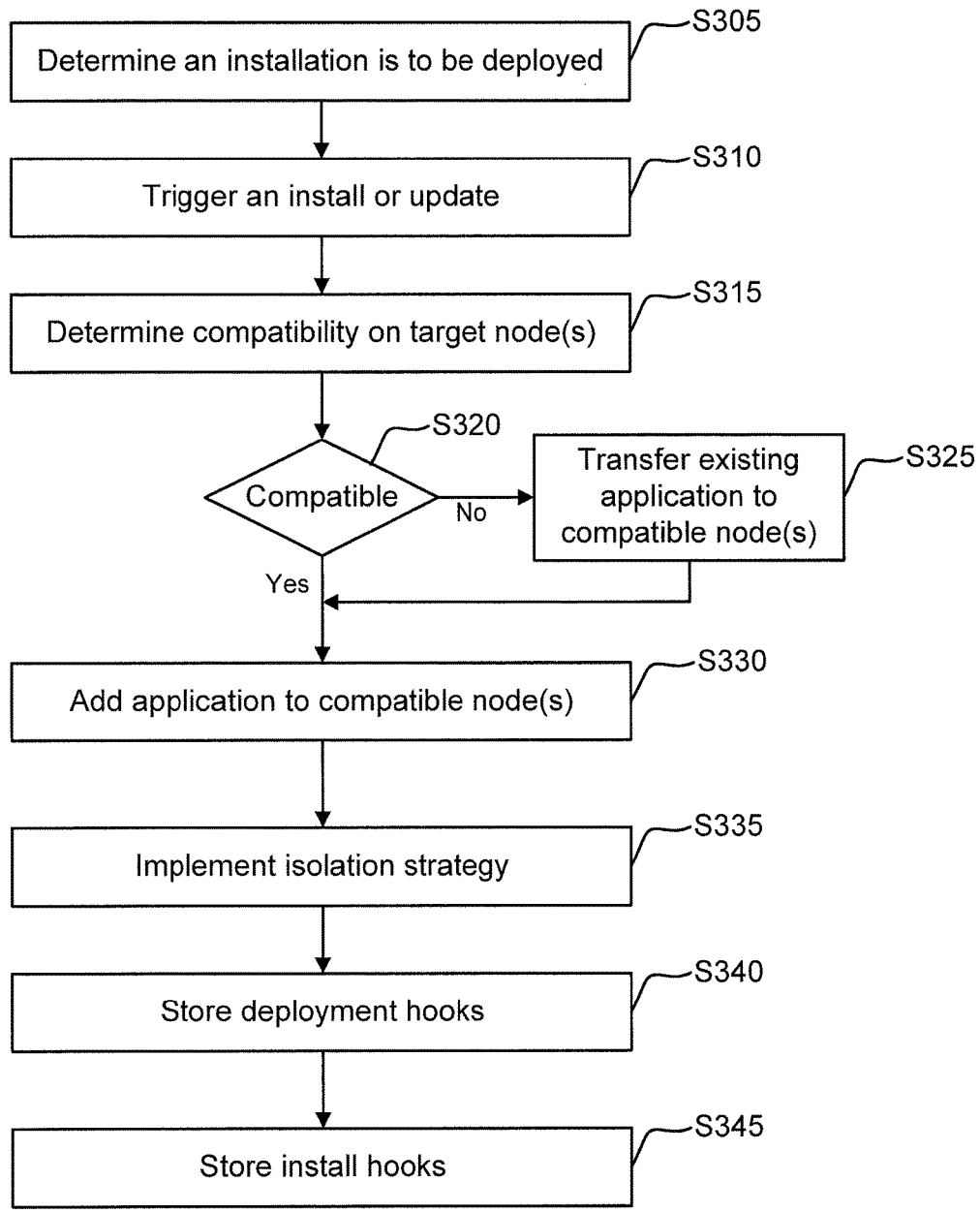
FIG. 3 illustrates a deployment method according to at least one example embodiment.

FIG. 3 illustrates such a deployment method according to at least one example embodiment. Referring to FIG. 3, in step S305 a processor (e.g., processor 165) determines an installation is to be deployed by receiving information associated with the application to be deployed, the information including application compatibility information. For example, assuming at least one of the target nodes 155 is to perform the installation, processor 165 may receive the trigger to deploy an installation from processor 135. Alternatively, processor 135 may determine that the installation is to be on server 125.

In step S310, the processor triggers an install or an update. For example, if in step S215 processor 135 determined the installation is a new installation, the new installation may be triggered by the processor 165. For example, if in step S230 processor 135 determined the installation is a new version, the new version installation may be triggered by the processor 165. For example, if in step S230 processor 135 determined the installation is an update, the update may be triggered by the processor 165.

In step S315, the processor 165 determines compatibility information of one or more target nodes. For example, processor 165 may compare the requirements associated with the install to at least one of the target nodes 155. The comparison may include comparing the compatibility information determined in step S240 described above. For example, processor 165 may read an existing compatibility repository on a set of physical nodes (e.g., target nodes 155) and add the new application or software release to physical nodes that match, thereby merging the application or software with or without isolation mechanisms (described below) into these physical nodes, based on the one basic and one or more advanced compatible levels specified in the release descriptor.

In step S320, if the installation is not compatible with the target node or nodes, the processor 165 moves processing to step S325. Otherwise processing continues to step S330. In step S325, the processor 165, if the application information and the compatibility of the at least one target node is not confirmed, transfers an existing application associated with the application to a compatible target node or nodes. For example, processor 165 may create a virtual machine (e.g., virtual machine 175) on a node that is compatible with the installation. Processor 165 may then move an existing installation from a physical node to the newly created virtual machine and transfer all data to be preserved and configure virtual and/or physical machines for necessary data exchange and application invocations at run-time/operation time.

Alternatively, in step S325, the processor 165 may create a virtual machine for the non-compatible elements of the installation and install the applicable elements on the new virtual machine. In this case, the target node will include the common (e.g., elements that may be executed on the target node) elements as part of the installation. For example, the common elements may include elements of the installation that are not upgraded. As one skilled in the art will appreciate, if there is no available target node that is compatible with the installation, deployment of the installation may be terminated (not shown).

In step S330, the processor 165 adds the application to the compatible target node or nodes 155. For example, processor 165 may create a virtual machine (e.g., virtual machine 175) on a node that is compatible with the installation. Processor 165 may then add the installation to the newly created virtual machine. If the application or software release is a hotfix and there are required intervening hotfixes, the processor 165 adds the application including intervening the hotfixes. The intervening hotfixes may be found on the memory 150, or alternatively may need to be downloaded from some other location via, for example, the internet.

In step S335, the processor 165 implements an isolation strategy. HyAD isolation strategies may isolate software that does or doesn't fulfill one or more compatibility level at any given time. For example, one isolation strategy may include no isolation, in other words the software is directly merged into the existing installation. Another isolation strategy may include hardware/physical node isolation. This isolation may include installation of software, for example, the product-line basic compatibility level and may include executing HyAD hooks to create connections to local and/or central repositories, depending on the release descriptor and deployment descriptor of the independent release.

Another isolation strategy may include creation of a new virtual machine. This isolation may include installation of software, for example, the product-line basic compatibility level and may include executing HyAD hooks to create connections to local and/or central repositories, depending on the release descriptor and deployment descriptor of the independent release.

Still another isolation strategy may include creation of isolation directories for the new software. In this isolation strategy, the application or software is merged into the existing installation but kept isolated. This isolation may include installation of software, for example, the product-line basic compatibility level and may include executing HyAD hooks to create connections to local and/or central repositories, depending on the release descriptor and deployment descriptor of the independent release.

Still another isolation strategy may include defining a smallest allowed entity size for isolation or installation in autonomous HyAD activities by the architecture of the product-line. The smallest allowed entity size may be a consistent bundle of components or building blocks in one or multiple known 'cab' files that also the installer uses. Aggregations of such 'cab' files can be defined in HyAD strategies (e.g., strategy information 120) for example, for the initial installation of a new virtual machine In step S340, the processor 165 stores deployment hooks. For example, processor 165 may store the deployment hooks in memory 180 as the HyAD deployment hooks 185. In step S345, the processor 165 stores install hooks. For example, processor 165 may store the install hooks in memory 180 as the HyAD install hooks 185.

Hooks (e.g., deployment and install hooks) may be used when intercepting calls to an application to determine where to run the application from. Hooks may be used to execute multiple versions of an application (or installation) depending on certain conditions. For example, executing an earlier version of an application may prevent compatibility issues between coordinating applications (e.g., one version of an application may be designed to run on a certain version of an operating system).

One other embodiment of the present application includes a method. The method includes intercepting an application call, determining if an application associated with the application call has an associated hook and executing the application from a location based on the hook.

Figure 4:
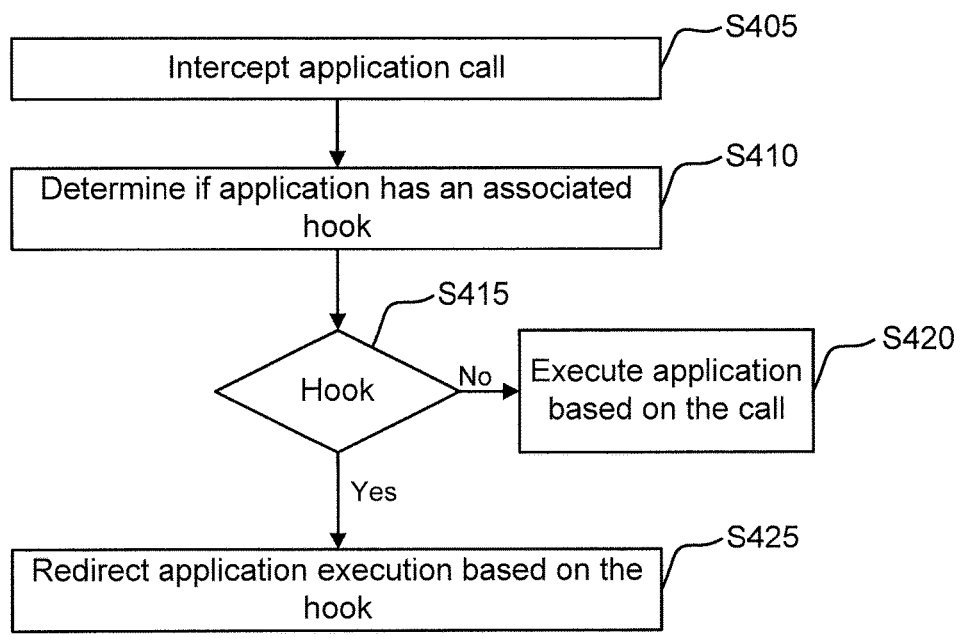
FIG. 4 illustrates an application execution method according to at least one example embodiment.

FIG. 4 illustrates an application execution method according to an example embodiment. Referring to FIG. 4, in step S405 a processor 165 intercepts an application call. For example, referring to the computed tomography (CT) system described below, a user of the CT system launches (e.g., application call) an application (e.g., edit 3D data). The processor 165 intercepts this application call before an executable program begins.

In step S410, the processor 165 determines if the application has an associated hook (e.g., deployment hook). For example, processor 165 searches memory 180 and at least one of HyAD deployment hooks 185 and HyAD install hooks 190 for the application associated with the application call.

In step S415, if the application does not have an associated hook, processing moves to step S420. Otherwise, processing continues to step S425. In step S420, the processor 165 executes the application based on the call. Executing an application based on the call is known to those skilled in the art and will not be discussed further for the sake of brevity.

In step S425, the processor 165 redirects the application execution based on the hook. For example, if the application call is the 'edit 3D data' call referred to above, processor 165 will execute the appropriate version of the 'edit 3D data' based on the hook. For example, if the most recent version of the 'edit 3D data' application is version 3.1.3 and the common product-line code associated with the CT system does not support version 3.1.3 of the 'edit 3D data' application, the processor 165 redirects the application call to a version of the 'edit 3D data' application that is supported by the CT system.

Alternatively to the steps of FIG. 4, the invocation path of an application may be set persistently execute the latest installed version. This is a design time (or install time) decision that may be based on compatibility levels of the hardware or other installations.

According to example embodiments, the HyAD offers combined and automated features for the purpose of installation and deployment at the same time that are normally not combined but treated separately, with a mixture of tools and manual steps, which in turn never allowed the presented degree of flexible and autonomous automation. The HyAD solution allows to merge independent but tightly cooperating products using a system including two dedicated types of compatibility levels and reliable, and dedicated finer grained isolation mechanisms.

Example embodiments may be compatible with cloud computing technology. For example, the HyAD may be an element of a node controller of a cloud. HyAD executes before the actual installer runs and enhances the work of the installer with HyAD hooks on demand, based on automated considerations, which allows the paradigm shift from automated pure imperative to automated cooperative installation.

According to example embodiments, the HyAD may automate installation and deployment before an installer runs. This may allow switching from a pure imperative installation to cooperative installation. The HyAD avoid the well known "dll hell" that grows with unattended but independent releases to the same installed base. The HyAD may simplify the install hooks or update hooks of an independent release, because they remain deployment independent. HyAD may offer a development site a flexible support mechanism in order to deliver independent application releases, based on compatibility levels and isolation mechanisms. HyAD may offer a re-deployment of the identical software releases after a number of hardware nodes have been replaced, e.g. for performance and scalability improvements, and HyAD will then use the HyAD strategies that fit best with the parameters of the new hardware, which allows for e.g. a new way on how to use the available isolation mechanisms because the e.g. the history for the new hardware nodes is empty, while the software release history is still valid and will be used by HyAD to install the replaced hardware nodes accordingly.

HyAD may provide a development site with a flexible support mechanism to test new releases on a variety of deployments with automated test harnesses. Hotfixes may be submitted to the installed base, and the HyAD may use them in all places that fit, without the need to pre-analyze what customer site runs what topology of the products. This may avoid multiple hotfix lines, with retests, shipment and handling on customer site.

Figure 5:
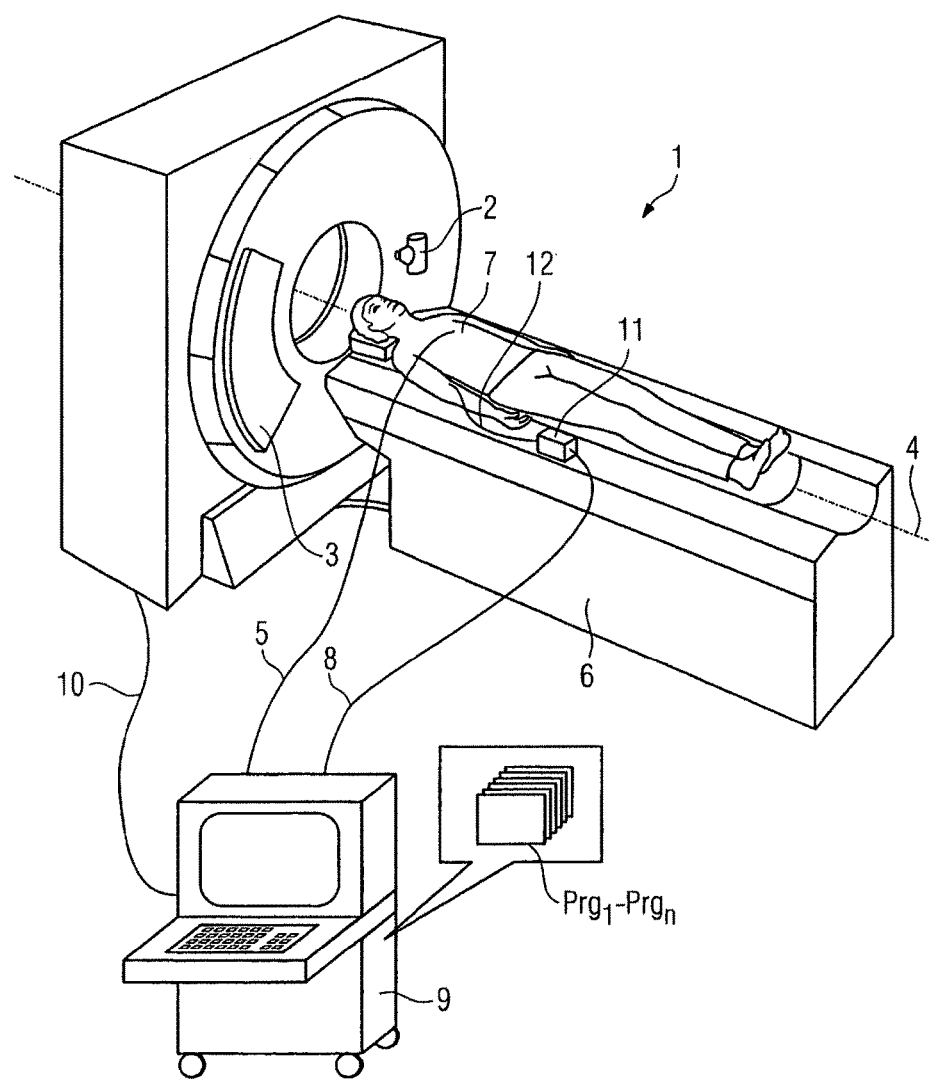
FIG. 5 illustrates a system for computed tomography according to example embodiments.

FIG. 5 illustrates an example embodiment of a system for computed tomography. The system for computed tomography 1 may be a medical work flow management system, for example. As shown in FIG. 5, the system for computed tomography 1 may include an X-ray tube 2, a detector 3, a system axis 4, an ECG lead 5, a displaceable patient couch 6, a patient 7, a control line for the injector 8, a control and arithmetic logic unit 9, a control and data line to the CT 10, an injector 11 an a contrast medium line 12.

As is illustrated by FIG. 5, the computed tomography system 1 may include the control and arithmetic logic unit 9 including data memories with programs $Prg_1$-$Prg_n$. As one skilled in the art will appreciate, individual method steps and control tasks may be distributed among different computers within the scope of the example embodiments. The control and arithmetic logic unit 9 shown here is connected via a control and data line 10 to the actual CT, which has an X-ray tube 2 and, oppositely thereto, a detector that is fastened on a gantry and can move on a circular track in order to scan the patient.

During a scanning operation, a patient 7 who is located on a couch 6 that can be displaced in the direction of the system axis 4, may be displaced in the direction of the system axis 4 such that, in the final analysis, spiral scanning takes place relative to the patient's coordinate system. The computed tomography system 1 additionally may include an ECG that is integrated in the arithmetic logic unit 9 and scans the heart rate of the patient 7 via the ECG line 5. Furthermore, the control and arithmetic logic unit 9 may use the control line 8 to operate an injector 11 with the aid of an integrated contrast medium pump, and via the hose line 12 depicted this injector 11 may inject the required contrast medium into the patient's 7 blood circulation at a prescribed flow rate.

According to an example embodiment, the programs $Prg_1$ to $Prg_n$ stored in the arithmetic logic and control unit may firstly push the patient 7 so far into the beam path of the CT that a so-called pre-scan of a cardiac artery can be carried out. There is no feeding of the patient 7 in the case of this pre-scan, rather, a tomogram of the heart may be produced only in a plane of low dose rate in order to establish the contrast medium filling of an artery essential to the examination.

If the patient 7 is located in the correct pre-scan position, the injector 11 may inject contrast medium at a prescribed flow rate, and either the operator may use the reconstructed tomogram output on a illustration screen to establish when there is a sufficient contrast medium filling in the observed cardiac artery, or an appropriate program can establish via automatic image processing whether sufficient contrast is present in the reconstructed image for a good illustration of the arteries.

As one skilled in the art will appreciate, CT system 1 may include several cooperating applications (e.g., $Prg_1$-$Prg_n$). According to example embodiments in order to provide release independent versions of these cooperating applications, software and applications may be deployed on CT system 1 using the method steps described above with regard to FIGS. 2-4.

For example, CT system 1 may include several cooperating programs such as common product-line code, a 3D editing application, a 2D editing application, an image capture application, a patient couch movement application and an injector application. If the current injector application is version 1.2.0 and the injector manufacturer develops a hotfix which becomes injector application version 1.2.1, according to example embodiments a technician may independently install the hotfix. As a result processor 135 intercepts the installation (S205) and classifies the installation as a hotfix for the injector (S215). The processor determines that the installation is not a new installation (S215), that the installation is to the CT system 1 as the target node (S235), the compatibility of the hardware associated requirements of the hotfix (S240), that the installation is a standalone installation (S245) and initiates the deployment of the hotfix (S250).

Control passes to processor 165 (as a processor associated with arithmetic logic unit 9) which determines a hotfix is to be deployed for the injector 11 (S305). Processor 165 triggers the install as a hotfix on the CT system 1 (S310). Processor 165 determines the compatibility with the hotfix associated with the injector 11 and the CT system 1 (S315) and compares the compatibility with the information from step S240 (S320). Assuming the hotfix is compatible, a new virtual machine is created on the CT system 1 and the hotfix is installed on the virtual machine (S330). The isolation strategy is the use of a virtual machine (S335). The processor 165 stores deployment hooks (S245) and the processor 165 stores install hooks (S250) for the hotfix in memory 180.

A scan is to be performed on a patient using a contrast medium at a prescribed flow rate. The scan is initiated and before the injector code is loaded for execution, the injector application is intercepted (S405). A hook is searched for and found in memory 180 for the injector 11. If the hotfix, version 1.2.1 is compatible with the common product-line code for the CT system 1, an application for the injector 11 is executed including the hotfix. Otherwise, an application for the injector 11 is executed using version 1.2.0 of the injector code.

Although the above example was described with regard to a computed tomography system, example embodiments are not limited thereto. For example, a system of an example embodiment of the present application may be another type of imaging system (e.g., MRI, PET, etc.). Further, example embodiments are not limited to scanning (acquisition) steps of the clinical workflow. For example, example embodiments may be related to post processing, reading, and reporting workflow steps. Further, example embodiments are not limited to imaging systems. For example, example embodiments may be related to a clinical study system or other health care management system.

Alternative embodiments of the invention may be implemented as a computer program product for use with a computer system, the processor program product being, for example, a series of processor instructions, code segments or program segments stored on a tangible or non-transitory data recording medium (processor readable medium), such as a diskette, CD-ROM, ROM, or fixed disk, or embodied in a computer data signal, the signal being transmitted over a tangible medium or a wireless medium, for example, microwave or infrared. The series of processor instructions, code segments or program segments can constitute all or part of the functionality of the methods of example embodiments described above, and may also be stored in any memory device, volatile or non-volatile, such as semiconductor, magnetic, optical or other memory device.

One embodiment of the present application includes a computer readable medium. The computer readable medium includes code segments that, when executed by a processor cause the processor to intercept an application installation procedure, classify the application, determine information associated with the application and install the application based on the classification and the determined information. Installing the application may further include determining compatibility information of one or more target nodes and adding the application to at least one of the target nodes if the application compatibility information and the compatibility of the at least one target node is confirmed.

Although the above example was described with regard to a computed tomography system, example embodiments are not limited thereto. For example, system may be another imaging system (e.g., MRI, PET, etc.). Further, example embodiments are not limited to imaging systems. For example, example embodiments may be related to a clinical study system or other health care management system. Further, as one skilled in the art will appreciate, example embodiments may be related to any system using several cooperating applications such as manufacturing equipment (e.g., robots) or cloud computing environments, but are not limited thereto.

While example embodiments have been particularly shown and described, it will be understood by one of ordinary skill in the art that variations in form and detail may be made therein without departing from the spirit and scope of the claims. The invention being thus described, it will be obvious that the same may be varied in many ways. Such variations are not to be regarded as a departure from the invention, and all such modifications are intended to be included within the scope of the invention.

I claim:

1. A method, comprising:
    intercepting an application installation procedure by stopping or pausing a software release installer, copying release code and installation parameters and storing state information about the installation;
    classifying the application;
    determining information associated with the application, including determining historical information associated with the application, the historical information including installation history information and previous installation locations among a plurality of target nodes;
    determining an installation location for the application on at least one of the plurality of target nodes based on the determined information;
    deploying installation of the application to the at least one of a plurality of target nodes for installation by an installer on the at least one target node;
    installing the application based on the classification and the determined information;
    implementing an application isolation strategy, such that the application isolation strategy isolates applications of different versions from each other; and
    creating a virtual machine on at least one of the target nodes, wherein the application is added to the virtual machine and the virtual machine implements the isolation strategy.

2. The method of claim 1, wherein classifying the application includes classifying the application as one of a new application, a new release and an update.

3. The method of claim 1, wherein classifying the application includes classifying a system on which the application is to be installed.

4. The method of claim 1, wherein classifying the application includes classifying information about a product associated with the application.

5. The method of claim 4, wherein the classifying information about a product associated with the application includes at least one of a product name, product line advanced compatibility level descriptors and deployment type descriptors.

6. The method of claim 1, wherein the information associated with the application includes at least one of the installation location and compatibility information.

7. The method of claim 1, wherein determining information associated with the application includes determining if the installation is in one of a standalone and a distributed environment.

8. The method of claim 7, wherein the standalone environment is a medical imaging device.

9. The method of claim 1, wherein
    the information associated with the application includes application compatibility information,
    the installing the application step includes,
        determining compatibility information of one or more target nodes, and
        adding the application to at least one of the target nodes if the application compatibility information and the compatibility of the at least one target node is confirmed.

10. The method of claim 1, further comprising:
    storing at least one of a deployment hook and an install hook for the added application, such that the at least one deployment hook and install hook are used in making a call to the application.

11. A non-transitory computer readable medium including code segments that, when executed by a processor, cause the processor to perform the method of claim 1.

12. The method of claim 1, wherein
    the information associated with the application includes application compatibility information,
    the installing the application step includes,
        determining compatibility information of one or more target nodes,
        transferring an existing application associated with the application to at least one compatible target node if the application compatibility information and the compatibility of the at least one target node is not confirmed, and adding the application to at least one of the compatible target nodes.

13. The method of claim 12, further comprising:

storing at least one of a deployment hook and an install hook for the added application, such that the at least one deployment hook and install hook are used in making a call to the application.

14. A non-transitory computer readable medium including code segments that, when executed by a processor, cause the processor to perform the method of claim 12.

15. The method of claim 1, wherein the installing the application step includes merging applications from multiple development sites at installation time.

16. An apparatus comprising:

a memory;

a processor; and a first module including code segments that, when executed by the processor, cause the processor to, intercept an application installation procedure by stopping or pausing a software release installer, copying release code and installation parameters and storing state information about the installation, classify the application, determine information associated with the application, including historical information associated with the application, the historical information including installation history information and previous installation locations among a plurality of target nodes;

determine an installation location for the application on at least one of the plurality of target nodes based on the determined information;

deploy installation of the application to the at least one of a plurality of target nodes for installation by an installer on the at least one target node; and a second module including code segments that, when executed by the processor, cause the processor to, install the application based on the classification and the determined information;

implement an application isolation strategy, such that the application isolation strategy isolates applications of different versions from each other; and create a virtual machine on at least one of the target nodes, wherein the application is added to the virtual machine and the virtual machine implements the isolation strategy.

* * * * *